(12) United States Patent
Hallen

(10) Patent No.: US 7,946,938 B2
(45) Date of Patent: May 24, 2011

(54) TENSIONER

(75) Inventor: Juergen Hallen, Aachen (DE)

(73) Assignee: The Gates Corporation, Denver, CO (US)

( * ) Notice: Subject to any disclaimer, the term of this patent is extended or adjusted under 35 U.S.C. 154(b) by 96 days.

(21) Appl. No.: 11/983,668

(22) Filed: Nov. 9, 2007

(65) Prior Publication Data

US 2009/0124442 A1    May 14, 2009

(51) Int. Cl.
    F16H 7/12    (2006.01)
(52) U.S. Cl. .................................. 474/135; 474/112
(58) Field of Classification Search ............... 474/133, 474/135, 109, 112
    See application file for complete search history.

(56) References Cited

U.S. PATENT DOCUMENTS

| | | | |
|---|---|---|---|
| 4,270,906 A * | 6/1981 | Kraft et al. ..................... | 474/135 |
| 4,698,049 A | 10/1987 | Bytzek et al. .................. | 474/135 |
| 5,234,385 A * | 8/1993 | Kawashima et al. .......... | 474/135 |
| 5,334,109 A * | 8/1994 | Izutsu et al. ................... | 474/135 |
| 5,443,424 A | 8/1995 | Henderson ...................... | 474/135 |
| 5,545,095 A | 8/1996 | Henderson ...................... | 474/135 |
| 5,660,083 A * | 8/1997 | Huang et al. .................... | 74/502.2 |
| 5,718,649 A | 2/1998 | Hong et al. ...................... | 474/91 |
| 5,803,849 A * | 9/1998 | Ayukawa .......................... | 474/94 |
| 5,803,850 A | 9/1998 | Hong et al. ..................... | 474/135 |
| 5,967,919 A * | 10/1999 | Bakker ............................ | 474/94 |
| 6,004,235 A * | 12/1999 | Ohta et al. ...................... | 474/109 |
| 6,059,679 A * | 5/2000 | Tsutsui et al. .................. | 474/135 |
| 6,264,578 B1 * | 7/2001 | Ayukawa ......................... | 474/135 |
| 6,468,172 B1 * | 10/2002 | Lang et al. ...................... | 474/135 |
| 6,497,632 B2 * | 12/2002 | Ayukawa et al. ............... | 474/135 |
| 6,575,860 B2 | 6/2003 | Dutil ................................ | 474/135 |
| 6,767,303 B2 * | 7/2004 | Ayukawa ......................... | 474/135 |
| 7,588,507 B2 * | 9/2009 | Ayukawa et al. ............... | 474/135 |
| 2003/0022746 A1 * | 1/2003 | Ayukawa ......................... | 474/135 |

* cited by examiner

*Primary Examiner* — Bradley T King
*Assistant Examiner* — Thomas Irvin
(74) *Attorney, Agent, or Firm* — J. A. Thurnau, Esq.; T. A. Dougherty, Esq.; P. N. Dunlap, Esq.

(57) ABSTRACT

A tensioner comprising a base, an arm engaged with the base for oscillatory movement, a torsion spring engaged with the base and the arm, the torsion spring exerting a force on the arm, a damping mechanism exerting a frictional damping force between the base and the arm for damping an arm oscillation, the damping mechanism comprising a Belleville spring, the frictional damping force instantaneously adjustable by changing a Belleville spring force.

5 Claims, 2 Drawing Sheets

TENSIONER

FIELD OF THE INVENTION

The invention relates to a tensioner, and more particularly, to a tensioner comprising an instantaneously adjustable damping mechanism comprising a Belleville spring.

BACKGROUND OF THE INVENTION

Tensioners are used to preload power transmission belts. The belts are used on belt drive systems on vehicle engines, for example, to power accessories or to drive camshafts.

Once installed the damping rate for tensioners is not adjustable. The damping rate, or coefficient, is a function of the damping material and the normal force exerted by a spring upon the damping material. During operation the damping material by its nature is worn away which can change the damping characteristics of the tensioner. Since the damping mechanisms are not adjustable the change in damping can result in adverse operating conditions, including excessive oscillations or tensioner failure.

Representative of the art is U.S. Pat. No. 6,575,860 to Dutil (2003) which discloses a belt tensioner for a power transmission belt system includes: (a) a base housing having a pivot shaft extending therefrom; (b) a tension arm pivotally mounted on the pivot shaft at a proximal end thereof, the proximal end of the tension arm including a rub surface and the distal end of the tension arm adapted to contact a power transmission belt; (c) a torsion spring operatively coupled between the base housing and the tension arm and adapted to bias the distal end of the tension arm against the power transmission belt; and (d) a damper assembly coupled to the housing, the damper assembly including: (1) a body of friction material that includes a friction surface adjacent to and facing the rub surface of the tension arm and (2) a damper spring integral with the body of friction material and biasing the body of friction material and associated friction surface against the rub surface of the tension arm.

What is needed is a tensioner comprising an instantaneously adjustable damping mechanism comprising a Belleville spring. The present invention meets this need.

SUMMARY OF THE INVENTION

The primary aspect of the invention is to produce a tensioner comprising an instantaneously adjustable damping mechanism comprising a Belleville spring.

Other aspects of the invention will be pointed out or made obvious by the following description of the invention and the accompanying drawings.

The invention comprises a tensioner comprising a base, an arm engaged with the base for oscillatory movement, a torsion spring engaged with the base and the arm, the torsion spring exerting a force on the arm, a damping mechanism exerting a frictional damping force between the base and the arm for damping an arm oscillation, the damping mechanism comprising a Belleville spring, the frictional damping force instantaneously adjustable by changing a Belleville spring force.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
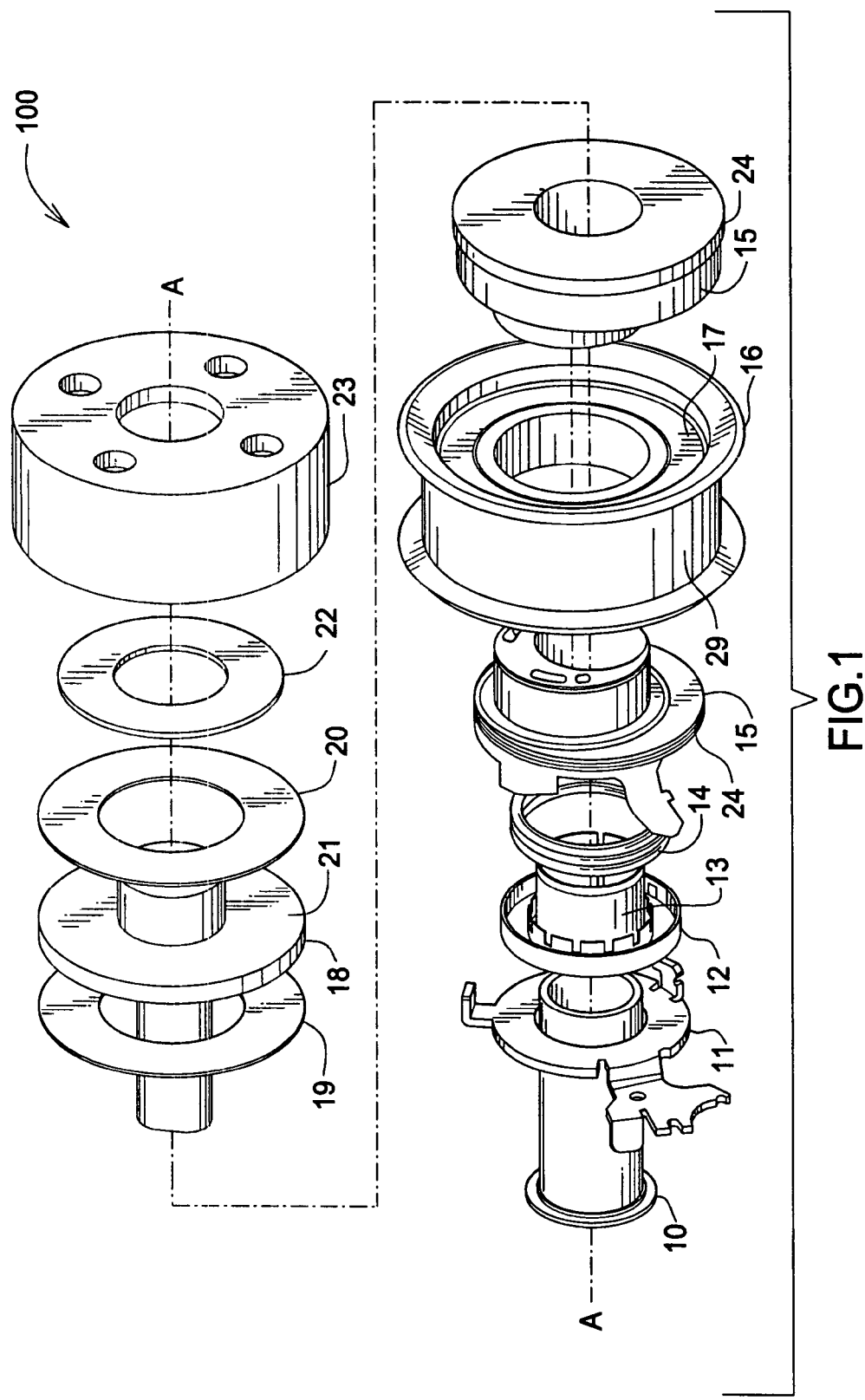
FIG. 1 is an exploded view of the tensioner.

FIG. 1 is an exploded view of the tensioner. Tensioner 100 comprises a sleeve 10. Fixedly attached to sleeve 10 is base 11 and spring receiver 12. Base 11 and spring receiver 12 do not rotate with respect to sleeve 10. Bushing 13 is disposed outwardly of sleeve 10. Bushing 13 is a low friction bushing for facilitating movement between sleeve 10 and arm 15.

One end of torsion spring 14 is connected to arm 15 and the other end is connected to spring receiver 12. Spring 14 biases arm 15 against a belt (not shown) in order to generate a belt load. The load imparted to a belt is a function of the spring rate of the torsion spring.

Pulley 16 is journalled to arm 15 through bearing 17. Bearing 17 comprises a ball bearing, but may also comprise a sleeve bearing or needle bearing as may be required by the service. A belt engages pulley 16 on belt engaging surface 29. Surface 29 may have any suitable profile including flat, multi-ribbed or v-shaped.

Adjuster 18 is coaxially engaged with sleeve 10. Adjuster 18 may be rotated within sleeve 10. Adjuster 18 is used to properly orient the tensioner arm with respect to a belt when the tensioner is installed for use. A bore 27 is eccentrically offset from the center of adjuster 18. Bore 27 extends axially through adjuster 18. During installation rotation of adjuster 18 will displace the center of rotation of pulley 16, thereby adjusting the position of arm 15 and pulley 16.

Damping plate 19 and damping plate 20 are each disposed on opposite sides of the radial planar member 21 of adjuster 18. Planar member 21 of adjuster 18 is fixedly connected to a mounting surface once the tensioner is installed. Damping plate 19 and damping plate 20 each comprise a surface coefficient of friction in the range of approximately 0.01 to approximately 0.5. Damping plates 19, 20 each comprise polymeric or plastic material suitable for the service and known in the damper arts. Member 21 extends radially from an axis of rotation A-A of arm 15. Member 21 may comprise steel or aluminum.

Belleville spring 22 is engaged between damping plate 20 and damping adjuster 23. Belleville spring may have a spring rate in the range of approximately 1000 N/mm to 5000 N/mm. Two or more springs 22 may be used in the tensioner depending upon the desired frictional force between the member 21 and damping plates 19, 20. Plural springs may be assembled in parallel, namely, 'nested' inside each other, i.e. the same way up, the resultant force for such a column is the force element of a single spring multiplied by the number of 'nested' springs in the column, while the total deflection remains the same as for that applicable to a single spring. For example, a spring that requires a force of 5000N to deflect 1 mm, when assembled of 3 disc springs in parallel, will require a force of ~15000N to deflect 1 mm. In the alternative, two or more springs may be assembled in series, that is, 'opposed to each other' to form a spring column. For example, in a series configuration a spring that requires a force of 5000N to deflect 1 mm, when assembled to form a column of 5 disc springs in series, will require a force of 5000N to deflect 5 mm.

Damping adjuster 23 is threadably engaged with arm 15. Arm 15 comprises threads 24 which are disposed about the outer edge of arm 15. A cooperating set of threads 25 are disposed about an inner surface 26 of damping adjuster 23.

Belleville spring 22 exerts a normal force directly upon damping plate 20, which in turn exerts a normal force upon member 21 and damping plate 19. Damping plate 19 is pressed between arm 15 and member 21. The frictional force is a function of the normal force (N) exerted on the damping plates 19, 20 and the coefficient of friction (μ), namely, f=Nμ. The frictional force (f) opposes the oscillatory movement of arm 15, thereby damping the movement.

Belleville spring 22 is compressed between adjuster 23 and member 21. Due to the threaded engagement between damping adjuster 23 and arm 15 the amount of compression and hence the normal force exerted by Belleville spring 22 can be adjusted. By turning adjuster 23 clockwise Belleville spring 22 can be further compressed which increases the normal force (N), which in turn increases the frictional force (f) between damping members 19, 20 and member 21. This in turn increases the damping factor or coefficient (ζ) of the tensioner. Turning the damping adjuster 23 anti-clockwise has the opposite effect, namely it decreases the normal force being exerted by the Belleville spring on the damping members 19, 20, which changes the frictional damping force exerted by the damping members 19, 20 on member 21. This in turn damps movement of arm 15. Each surface of member 21 that engages a damping member 19, 20 comprises a coefficient of friction in the range of approximately 0.2 to approximately 0.5.

In operation adjuster 23 is fixedly connected to arm 15 due to the threaded connection and therefore oscillates with arm 15 about sleeve 10. Adjuster 23 does not engage adjuster 18.

A fastener (not shown) engaged through bore 27 in adjuster 18 is used to attach the tensioner to a mounting surface.

Figure 2:
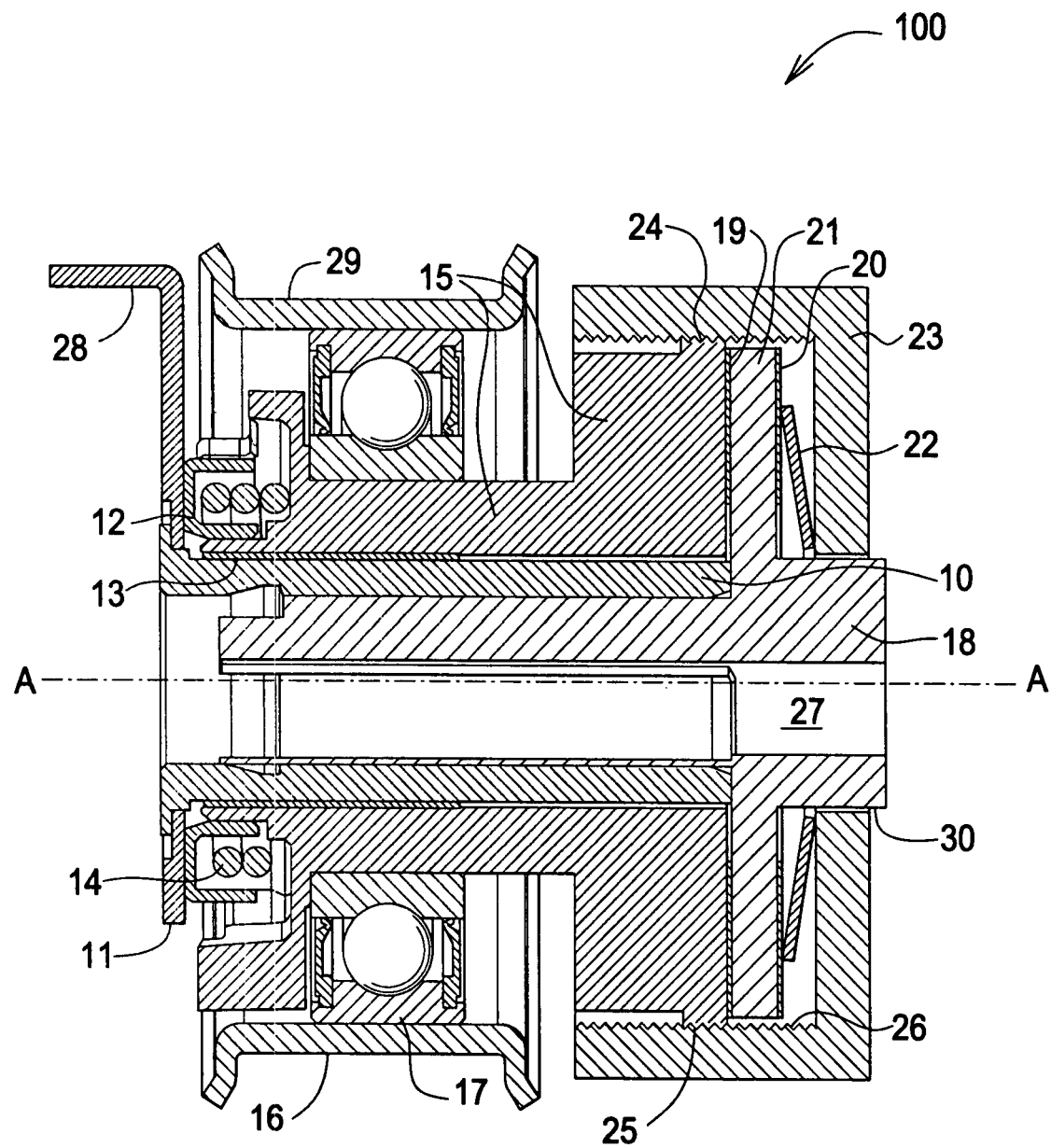
FIG. 2 is a cross sectional view of the tensioner.

FIG. 2 is a cross sectional view of the tensioner. A pin 28 is used to locate the proper position of base 11 on a mounting surface. Pin 28 cooperatively engages a receiving portion in a mounting surface (not shown). Damping members 19, 20 and member 21 and Belleville spring 22 and damping adjuster 23 generally comprise the adjustable damping mechanism.

Adjuster 18 may be rotated in sleeve 10 and therefore adjusted during tensioner installation by engaging a tool such as a wrench or ratchet to distal portion 30 of adjuster 18.

A single spring 22 is shown, but two or more may be used in series or parallel with equal success.

During operation arm 15 oscillates about sleeve 10 on bushing 13 as a belt tension varies. The oscillatory movements of arm 15 are damped by operation of the adjustable damping mechanism. By turning the damping adjuster 23 a user may instantaneously change the frictional force and hence damping magnitude being applied to the arm by the damping mechanism. The change to the damping force may be made instantaneously while the belt drive system is in operation so that arm oscillations may be tuned out of a belt system in real time without shutting down the system. Adjuster 23 may be adjusted by hand or by use of a tool.

Although a form of the invention has been described herein, it will be obvious to those skilled in the art that variations may be made in the construction and relation of parts without departing from the spirit and scope of the invention described herein.

I claim:

1. A tensioner comprising:
    a base;
    an arm engaged with the base for oscillatory movement;
    a torsion spring engaged with the base and the arm, the torsion spring exerting a force on the arm;
    a damping mechanism exerting a frictional damping force between the base and the arm for damping an arm oscillation, the damping mechanism comprising a Belleville spring;
    the damping mechanism comprises a damping adjuster threadably engaged with the arm;
    the frictional damping force instantaneously adjustable by rotating the damping adjuster in relation to the base and the arm thereby changing a Belleville spring force.

2. The tensioner as in claim 1, wherein:
    the damping mechanism comprises a radially extending planar member fixedly connected to the base; and
    a damping member is disposed between the Belleville spring and the radially extending planar member.

3. The tensioner as in claim 2, wherein the damping mechanism comprises a damping adjuster threadably engaged with the arm.

4. The tensioner as in claim 1, wherein the base comprises a pin for determining an installation position.

5. The tensioner as in claim 1 further comprising two or more Belleville springs.

* * * * *